United States Patent [19]

Namba et al.

[11] Patent Number: 5,089,587
[45] Date of Patent: * Feb. 18, 1992

[54] EPOXY RESINS AND MANUFACTURING METHOD THEREOF BASED ON PHENOLDICYCLOPENTADIENE ADDUCTS

[75] Inventors: Hiroaki Namba; Minoru Hishinuma, both of Iwakuni, Japan

[73] Assignee: Sanyo-Kokusaku Pulp Co., Ltd., Tokyo, Japan

[*] Notice: The portion of the term of this patent subsequent to Aug. 16, 2005 has been disclaimed.

[21] Appl. No.: 457,865

[22] Filed: Dec. 27, 1989

Related U.S. Application Data

[63] Continuation-in-part of Ser. No. 296,882, Jan. 12, 1989, abandoned, which is a continuation of Ser. No. 57,646, Jun. 26, 1987, abandoned, which is a continuation of Ser. No. 767,434, Aug. 20, 1985, abandoned.

[30] Foreign Application Priority Data

Aug. 20, 1985 [JP] Japan .................. 59-245795

[51] Int. Cl.$^5$ ............................................. C08G 59/06
[52] U.S. Cl. .................................. 528/97; 525/523; 525/534; 549/560
[58] Field of Search ............... 528/97; 525/523, 524; 549/560

[56] References Cited

U.S. PATENT DOCUMENTS

| | | | |
|---|---|---|---|
| 3,419,624 | 12/1968 | Cotter et al. | 528/97 X |
| 3,536,734 | 10/1970 | Vegter et al. | 528/97 X |
| 3,944,523 | 3/1976 | Gobran | 525/534 |
| 4,390,680 | 6/1983 | Nelson | 528/101 X |
| 4,394,497 | 7/1983 | Nelson et al. | 528/97 X |
| 4,764,571 | 8/1988 | Namba et al. | 528/97 X |

Primary Examiner—John Kight, III
Assistant Examiner—Frederick Krass
Attorney, Agent, or Firm—Oblon, Spivak, McClelland, Maier & Neustadt

[57] ABSTRACT

An epoxy resin having the formula:

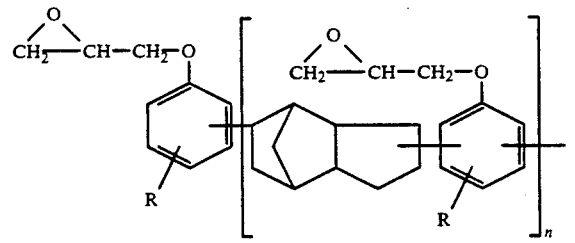

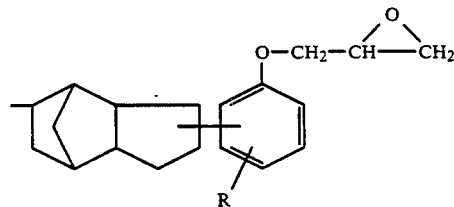

wherein R is a hydrogen atom or a methyl group, and n is an integer of from 0 to 15, and wherein the resin has an epoxy equivalent in the range of 320–345 g/eq.

8 Claims, 4 Drawing Sheets

EPOXY RESINS AND MANUFACTURING METHOD THEREOF BASED ON PHENOLDICYCLOPENTADIENE ADDUCTS

The present application is a continuation-in-part (CIP) of application Ser. No. 07/296,882 filed on Jan. 12, 1989, which is a file wrapper continuation (FWC) application of application Ser. No. 07/057,646 filed on June 26, 1987, now abandoned, which is a file wrapper continuation (FWC) application of application Ser. No. 06/767,434 filed on August 20, 1985, now abandoned.

DESCRIPTION OF THE INVENTION

1. Field of the Invention:

The present invention relates to an epoxy resin having improved properties

2. Description of the Background

Epoxy resins are used widely in the electric and electronic fields, since they have excellent mechanical properties, electric properties, thermal properties, chemical resistance and adhesiveness. In addition to an increase in the degree of integration of the electronic parts, thinning of the layer and miniaturization are now in vogue. Particularly, in the case of electronic parts sealed with resin, there are such problems as the residual stress which occurs after resin curing. Moreover, in the case of resin for a printed wiring board, heat resistance and flexibility are also required Thus, a need continues to exist for resins having such properties.

SUMMARY OF THE INVENTION

Accordingly, it is an objct of the present invention to provide an epoxy resin having excellent heat resistance, flexibility and reduced residual stress after curing.

It is also an object of the present invention to provide a method for producing such a resin.

The above objects and others which will become more apparent are provided by an epoxy resin having the formula

DETAILED DESCRIPTION OF THE PREFERRED EMBODIMENTS

Figure 1:
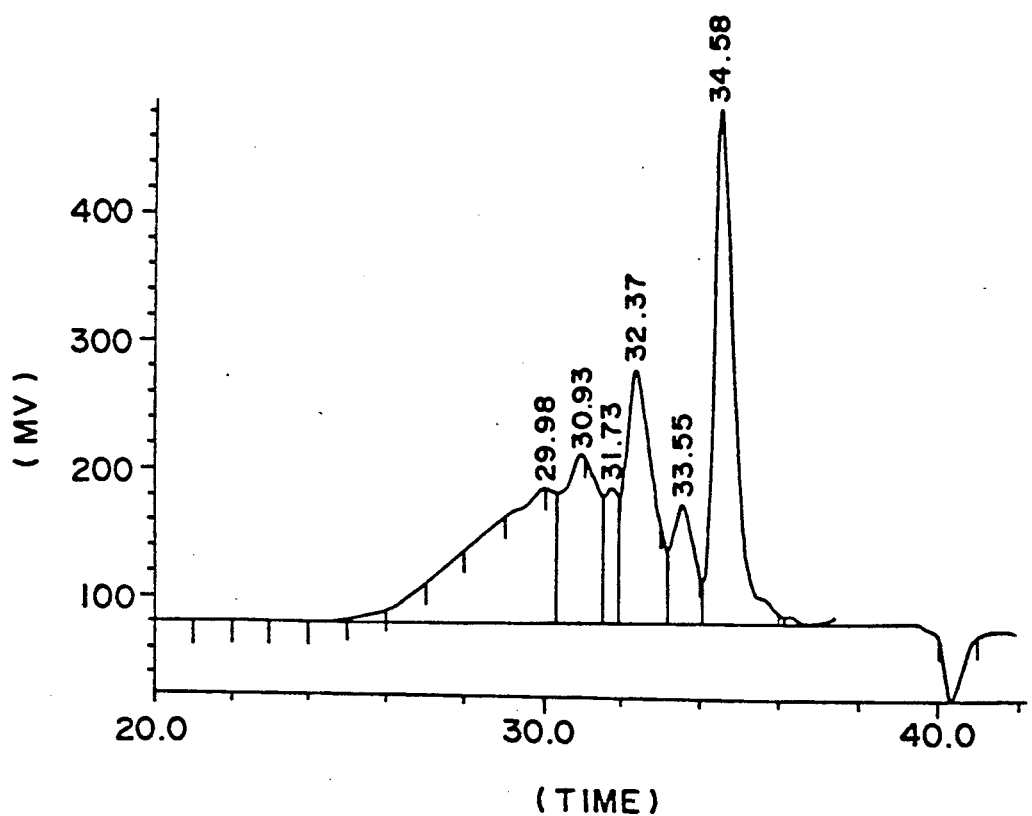
FIGS. 1 and 2 illustrate gel permeation chromatograms of the compounds obtained in Examples 1 and 2, respectively.

The epoxy resins of the invention represented in the aforementioned formula I have a greatly reduced residual stress after resin curing with improved heat resistance and flexibility.

The epoxy resins of the invention can be obtained advantageously by allowing epichlorohydrin to react with the resins obtained through the polymerization of phenols with dicyclopentadiene.

Two steps are included in the manufacturing method of the present invention. The first entails the polymerization of phenols with dicyclopentadiene using a catalyst, while the second is a process to glycidylize the phenolic hydroxyl groups present in the polymerization product with epichlorohydrin.

As the phenols to be used in the first process, phenol, o-cresol, m-cresol, p-cresol, ethyl phenol and isopropyl phenol, for example, can be mentioned.

For the catalysts in the first process, Lewis acids may be used. As the Lewis acids, $AlCl_3$, $BF_3$, $ZnCl_2$, $H_2SO_4$, $TiCl_4$, $H_3PO_4$, for example, can be mentioned. They are used independently or as a mixture of more than two. After the phenols are allowed to melt by heating and the catalyst added thereto is dissolved uniformly, dicyclopentadiene is added dropwise at about 50° to 180° C., preferably about 80° to 150° C. Respective addition amounts are about 0.001 to 0.1 mol, preferably about 0.005 to 0.10 mol of the catalyst and about 0.1 to 10.0 mol, preferably about 0.3 to 4 mol of the phenols to 1 mol of dicyclopentadiene. In this process the phenols may be added to a mixture of dicyclopentadiene and the catalyst. Also, the catalyst may be added gradually to a mixture of dicyclopentadiene and the phenols. The time for the addition is selected to be about 1 to 10 hours depending upon the formulation of raw materials and thereafter, the reaction is continued for several hours. Following this, the unreacted monomer is distilled off under reduced pressure to obtain the resins represented by the formula II:

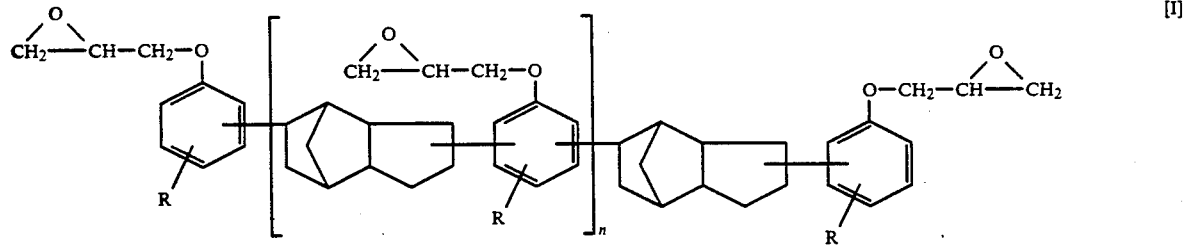

wherein R is a hydrogen atom or a methyl group, and n is an integer of from 0 to 15, and wherein said resin has an epoxy equivalent in the range of 320-345 g/eq.

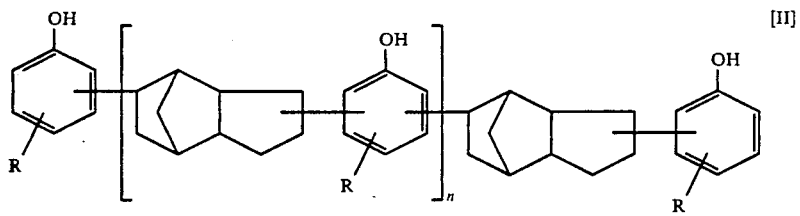

wherein, R indicates a methyl group or a hydrogen atom and n indicates an integer of 0 to 15.

In the polymerization reaction, solvents such as nitrobenzens, light oil, and carbon disulfide, for example, which are inert to the reaction may also be added. In the second process, the resin II obtained from the first step is dissolved into about 1 to 20 times mol., preferably about 2 to 10 times mol of epichlorohydrin to an amount equivalent to the phenolic hydroxyl groups of the resin. This reaction liquor is kept at about 10° to 120° C., preferably about 50° to 90° C. and subjected to the addition reaction in the presence of the catalysts such as quaternary ammonium salt, for example, to form the α-chlorohydrin derivative in which epichlorohydrin is attached to the phenolic hydroxyl groups. As the catalysts, quaternary ammonium salts such as tetramethyl ammonium bromide, benzyltriethyl ammonium bromide, tetraethyl ammonium chloride, etc., tertiary amines such as trimethylamine, halogenated phosphonium salts, alkali metal halides such as potassium bromide, sodium chloride, etc., and the like can be mentioned. They are used separately or in a mixed state. The amounts of the catalyst to be used are about 0.05 to 5.0 parts by weight to 100 parts by weight of resin II. Then, alkali is added successively to the reaction system while the system is kept under a reduced pressure of about 40 to 300 mmHg, and water is distilled off forming an azeotrope with epichlorohydrin. By adjusting the addition rate of alkali and the distillation conditions, the water content in the reaction system is made about 0.1 to 5.0% by weight. Although it is possible to effect the present method without removing water from the reaction system, this is disadvantageous in industrial practice because of the decomposition of epichlorohydrin with water in the system. Moreover, this is not preferable due to the formation of by-products in large quantities. The amount of alkali to be used is about 0.85 to 1.00 equivalent to an amount equivalent to the phenolic hydroxyl groups of resin II. As alkalies, sodium hydroxide, potassium hydroxide, barium hydroxide, and sodium carbonate, for example, can be mentioned, but sodium hydroxide and potassium hydroxide are preferable. The reaction temperature is about 30° to 120° C., preferably about 50° to 90° C. The reaction time must be sufficient to substantially effect completion of the ring closure reaction (dehydrohalogenation). Ordinarily, about 0.5 to 10 hours, preferably about 2 to 6 hours is required.

Then, after excessive epichlorohydrin is removed by distillation under reduced pressure, the reaction product is dissolved into organic solvents such as methyl isobutyl ketone, methyl ethyl ketone, and toluene, for example, and the metal halide formed secondarily is filtered off. The filtrate is washed several times with purified water, and then the organic layer is condensed under reduced pressure to obtain the epoxy resins of the invention.

The present invention will now be illustrated by certain examples which are provided solely for the purpose of illustration and are not intended to be limitative.

In the following examples, all "parts" referred to are parts by weight.

EXAMPLE 1

Into a reactor fitted with thermometer, cooler, stirrer and dropping pipe were charged 1000 parts of p-cresol and the temperature was kept at 100±5° C. while 15 parts of 47% BF$_3$-ether complex were added. Then, 416.9 parts of dicyclopentadiene were added dropwise over 4 hours. After the completion of addition, the temperature was kept at 100±5° C. for 1 hour, and thereafter, the unreacted p-cresol and BF$_3$ were distilled off under the conditions of 150° C. and 4 mmHg to obtain 950 parts of polymer.

Following this, 100 parts of polymer obtained and 1 part of tetramethyl ammonium bromide were dissolved into 250 parts of epichlorohydrin and allowed to react for 10 hours at 80±5° C. After the addition reaction was completed, a water separator was fitted, and 36 parts of 50% by weight aqueous solution of sodium hydroxide were added dropwise. During the addition, water was separated successively from the reaction system so as cause the water content in the system to be within a range of 0.1 to 2.0% by weight. After the completion of addition, the reaction was continued for 4 hours and then epichlorohydrin was distilled under reduced pressure. The reaction product remaining behind was dissolved into methyl isobutyl ketone, and sodium chloride present in the reaction system was filtered off. After the filtrate was washed further with purified water, and the organic solvent was distilled off from the organic layer to obtain the epoxy resin of the present invention.

EXAMPLE 2

The method of Example 1 was repeated except that the 47% BF$_3$-ether complex used in Example 1 was replaced by 8.5 parts of anhydrous aluminum chloride, to afford epoxy resin.

The physical properties of the product compounds of Examples 1 and 2 are shown in Table 1 and the attached drawings (FIGS. 1–4).

TABLE 1

Figure 2:
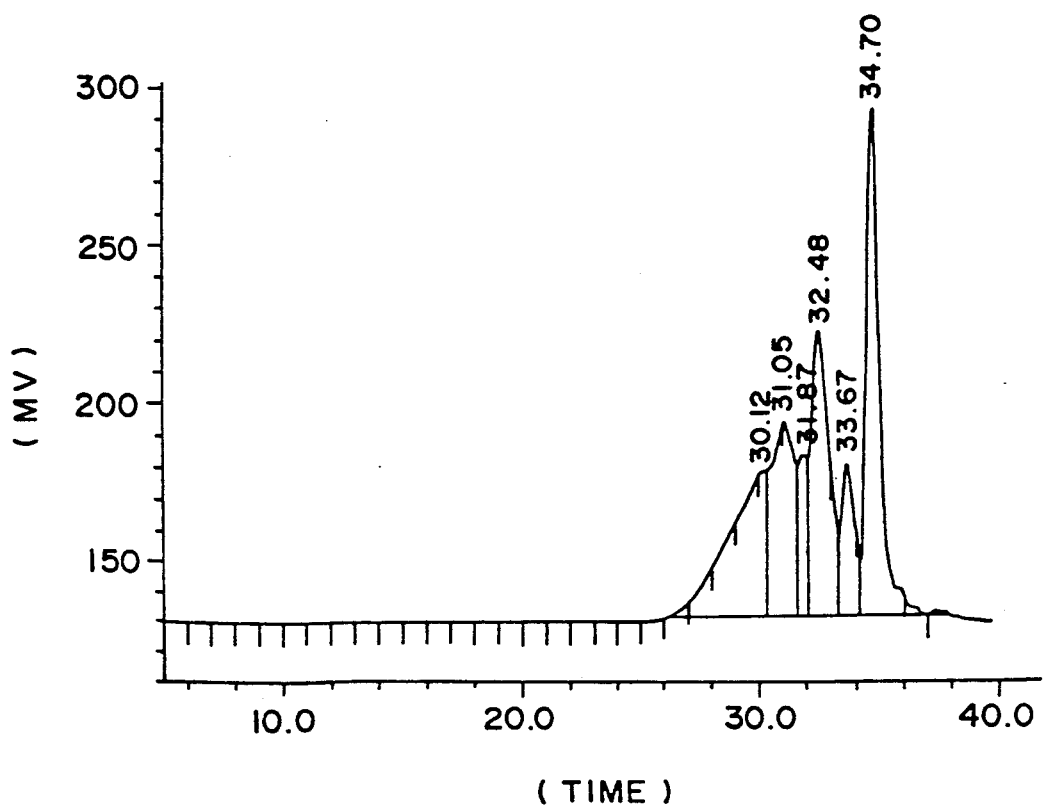
Figure 3:
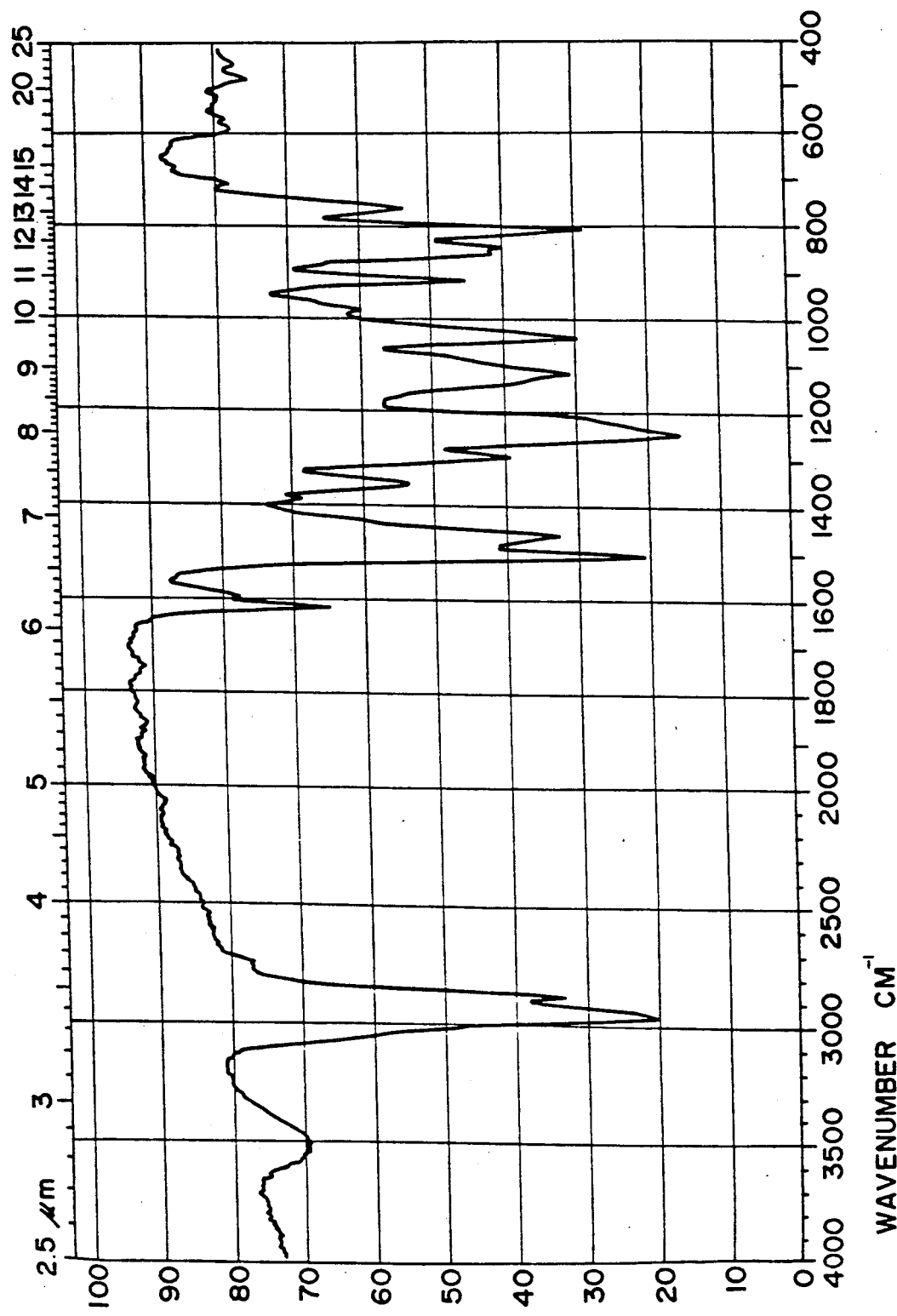
FIG. 3 represents an infra-red spectrum (KBr method) of the compound of the present invention.
Figure 4:
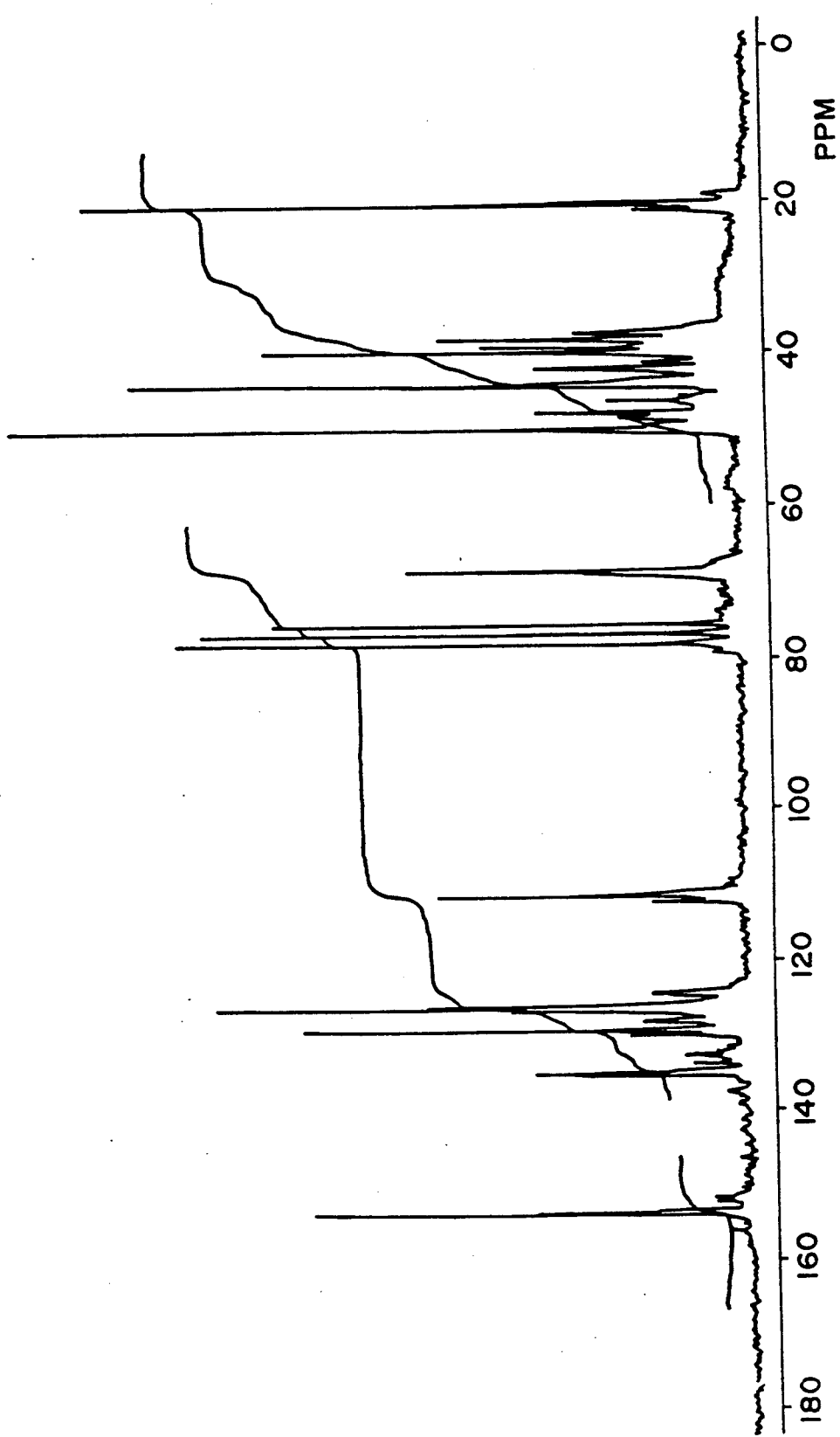
FIG. 4 represents a nuclear magnetic resonance (NMR) of the present compound.

| Ex. | Type of resin | Epoxy equivalent | Melting point | Hydrolytic chlorine | UV[1] spectrum | GPC[2] |
|---|---|---|---|---|---|---|
| 1 | p-Cresol dicyclopentadiene resin | 320 g/eq | 59–61° C. | 0.04% | 279.5 mm | FIG. 1 |
| 2 | p-Cresol dicyclopenta- | 345 g/eq | 62–64° C. | 0.05% | 279.5 mm | FIG. 2 |

TABLE 1-continued

| Ex. | Type of resin | Epoxy equivalent | Melting point | Hydrolytic chlorine | UV[1] spectrum | GPC[2] |
|---|---|---|---|---|---|---|
| | diene resin | | | | | |

[1]Ultraviolet absorption spectrum: $\lambda_{max}$ in $CHCl_3$
[2]GPC: Gel permeation chromatography
Column: TSK-4000HXL + 3000HXL + 2000HXL × 2

EXAMPLE 3

By employing the p-cresol-dicyclopentadiene resin produced in Example 1 as a base resin, and diaminodiphenylmethane (DDM) as a curing agent, respectively, compositions were prepared as shown in Table 2. The compositions were melted and mixed at 120° C., and poured into molds. Thereafter, they were subjected to curing in three successive stages of 12 hours at 160° C., 1 hour at 200° C. and 1 hour at 240° C. The physical characteristics of the cured products were shown in Table 3.

As is apparent from Table 3, the elasticity obtained when using p-cresol-dicyclopentadiene resin is smaller than that obtained when used ortho-cresol-novolak resin, although the coefficients of linear expansion in both cases are almost equal to each other. From this, it becomes clear that internal stress in the former case can be lowered.

Furthermore, in the former case, the water-absorbing coefficient is low, but the coefficient of water-resistance is excellent. Moreover, the electrical resistance is high, which establishes the formation of the cured product having excellent electrical properties. Additionally, the glass transition point and the temperature at which thermal loss amounts to 1% of weight in the former case are both higher than those in the latter case (Comparative Example), and the heat-resistance in the former case is superior to that of the latter.

COMPARATIVE EXAMPLE 1

According to the formulation shown in Table 2, ortho-cresol-novolak resin (epoxy equivalent:218 g/eq., average molecular weight M̄ w:3860, melting point:95° C. (and phenol-novolak) hydroxide group equivalent:104, melting point:71° C.) were melted and mixed together to give a resin, which was then cured likewise in Example 3. The cured product was then measured for physical properties, the results of which are shown in Table 3.

TABLE 2

| | Example | | Comparative |
|---|---|---|---|
| | 3-1 | 3-2 | Example 1 |
| Resin by Example 1 | 100 | | |
| Resin by Example 2 | | 100 | |
| Orthocresol-novolak Resin | | | 100 |
| Diamino-diphenylmethane | 15.3 | 14.2 | 47.1 |
| Epoxy equivalent | 320 | 345 | 218 |

TABLE 3

| | Example | | Comparative |
|---|---|---|---|
| | 3-1 | 3-2 | Example 1 |
| Glass transition Temp. (°C.) (note 1) | 175 | 176 | 178 |
| Volume resistivity (Ω cm) | $9.3 \times 10^{15}$ | $8.8 \times 10^{15}$ | $7.1 \times 10^{15}$ |
| Temperature of thermal loss by 1% in wt. | 320 | 314 | 281 |
| Coefficient of linear expansion (°C.$^{-1}$) | $6.7 \times 10^{-5}$ | $6.8 \times 10^{-5}$ | $7.7 \times 10^{-5}$ |
| Water-absorbing coefficient (%) | 0.20 | 0.21 | 0.26 |
| Storage elastic modules (G Pa) (note 2) | 1.8 | 1.8 | 2.6 |
| Gelation time (Sec) | 65 | 70 | 180 |

Note 1: determined by measuring the coefficient of linear expansion.
Note 2: measured value at 100° C.

EXAMPLE 4

The composition used to prepare the cured resin product and the physical properties of the cured product are shown in Table 4. From Table 4, it can be seen that when the epoxy equivalent is too low, such as below 260, the storage elastic modulus of the product is elevated and the resin becomes too hard, and the gelation time is prolonged inasmuch as the molecular weight becomes smaller. However, when the epoxy equivalent is too high, such as above 345, the resin elasticity is lowered, but the cross-linking density, heat-resistance and humidity-resistance are also lowered.

TABLE 4

| | Epoxy equivalent | Example 4 | Comparative Example | | |
|---|---|---|---|---|---|
| | | | 2 | 3 | 4 |
| P-Cresol dicyclopentadiene resin | 243 | | 100 | | |
| P-Cresol dicyclopentadiene resin | 280 | 100 | | | |
| P-Cresol dicyclopentadiene resin | 380 | | | 100 | |
| P-Cresol dicyclopentadiene resin | 420 | | | | 100 |
| Diamino-diphenylmethane | | 17.5 | 20.2 | 12.9 | 11.7 |
| Glass Transition Temperature (°C.) | | 185 | 183 | 170 | 158 |
| Temperature of thermal loss by 1% in weight | | 325 | 315 | 273 | 260 |
| Volume resistivity (Ω cm) | | $8.7 \times 10^{15}$ | $8.7 \times 10^{15}$ | $5.0 \times 10^{15}$ | $3.2 \times 10^{15}$ |
| Coefficient of linear | | $6.62 \times 10^{-5}$ | $6.61 \times 10^{-5}$ | $8.20 \times 10^{-5}$ | $9.0 \times 10^{-5}$ |

TABLE 4-continued

| | Epoxy equivalent | Example 4 | Comparative Example 2 | Comparative Example 3 | Comparative Example 4 |
|---|---|---|---|---|---|
| expansion | | | | | |
| Water-absorbing coefficient | | 0.19 | 0.20 | 0.23 | 0.24 |
| Storage elastic modulus (G Pa) | | 1.9 | 2.8 | 1.6 | 1.4 |
| Gelation time (sec) | | 62 | 90 | 232 | 240 |

By virtue of the present invention, an epoxy resin is provided which has surprisingly lower residual stress after resin curing, and with a surprisingly improved heat resistance and flexibility.

As may be seen from the table above, the present resin exhibits lowered internal stress after curing, improved resin elasticity, improved resin elasticity, cross-linking density, heat resistance and humidity resistance.

Numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. An epoxy resin having the formula:

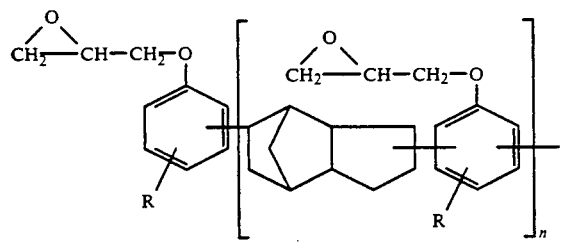

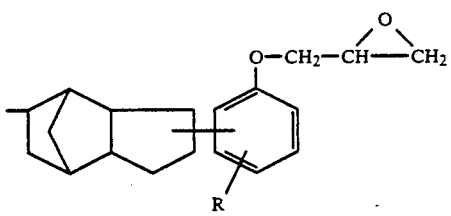

wherein R is a hydrogen atom or a methyl group, and n is an integer of 0 to 15, and wherein said resin has an epoxy equivalent in the range of 320–345g/eq.

2. A method preparing an epoxy resin having an epoxy equivalent in the range of 320–345g/eq. and having the formula:

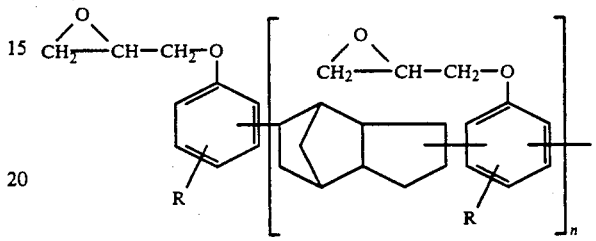

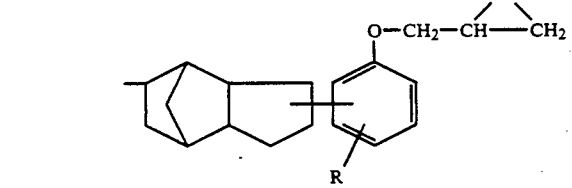

wherein R is a hydrogen atom or a methyl group, and n is an integer of from 0 to 15, which comprises:

a) reacting a phenol with dicyclopentadiene in the presence of a Lewis acid catalyst to form a resin of the formula:

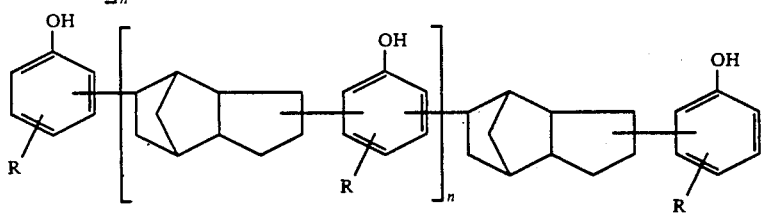

wherein R and n are as defined above, and then b) reacting said formed resin with epichlorohydrin in the presence of a catalyst selected from the group consisting of quarterly ammonium salts, tertiary amines, halogenated phosphonium salts and alkali metal halides.

3. The method of claim 2, wherein said phenol is selected from the group consisting of phenol, p-cresol, m-cresol, p-cresol, ethylphenol and isopropyl phenol.

4. The method of claim 3, wherein said phenol and dicyclopentadiene are reacted in the presence of a Lewis acid catalyst or a mixture of Lewis acid catalysts.

5. The method of claim 4, wherein said catalyst is a Lewis acid selected from the group consisting of $AlCl_3$, $BF_3$, $ZnCl_2$, $H_2SO_4$, $TiCl_4$ and $H_3PO_4$.

6. The method of claim 5, wherein the phenol is first melted and said catalyst is added thereto, and then said dicyclopentadiene is added dropwise at a temperature of about 50–180° C. in the amount of about 0.005–0.1 mol of catalyst, and about 0.1–10.0 mol of said phenol to 1 mol of dicyclopentadiene.

7. The method of claim 2, wherein the resin obtained from the polymerization of said phenol and dicyclopentadiene is dissolved in a 1-20 molar excess of epichlorohydrin at a temperature of about 10-120° C. in the presence of said catalyst.

8. The method of claim 7, wherein said catalyst is selected from the group consisting of tetramethylammonium bromide, benzyltriethylammonium bromide, tetraethylammonium chloride, trimethylamine, halogenated phosphonium salts, potassium bromide and sodium chloride; and is used in the amount of about 0.05-5.0 parts by weight per 100 parts by weight of resin.

* * * * *